United States Patent [19]

van der Hauw et al.

[11] Patent Number: 4,529,491

[45] Date of Patent: Jul. 16, 1985

[54] PHOTOPOLYMERIZABLE COMPOSITION, PHOTOINITIATOR MIXTURE AND CURING PROCESS

[75] Inventors: Tjerk van der Hauw, Diepenveen; Hans Jaspers, Putten, both of Netherlands

[73] Assignee: Akzona Incorporated, Chicago, Ill.

[21] Appl. No.: 431,526

[22] Filed: Sep. 30, 1982

Related U.S. Application Data

[62] Division of Ser. No. 315,799, Oct. 28, 1981, Pat. No. 4,442,022.

[30] Foreign Application Priority Data

Nov. 5, 1980 [NL] Netherlands ................ 8006035

[51] Int. Cl.³ .................. B23B 27/16; C08J 7/10
[52] U.S. Cl. .................. 204/159.23; 156/275.5
[58] Field of Search ............ 204/159.23; 502/150, 502/167; 428/426, 500; 156/275.5

[56] References Cited

U.S. PATENT DOCUMENTS

| | | | |
|---|---|---|---|
| 3,427,161 | 2/1969 | Laridon et al. | 430/287 |
| 3,759,807 | 9/1973 | Osborn | 204/159.23 |
| 3,933,682 | 1/1976 | Bean | 204/159.23 |
| 3,966,573 | 6/1976 | Bean | 204/159.23 |
| 4,024,297 | 5/1977 | Gruber | 204/159.23 |
| 4,054,682 | 10/1977 | Kuesters et al. | 204/159.24 |
| 4,054,721 | 10/1977 | Cordes | 204/159.23 |
| 4,077,858 | 3/1978 | Costanza | 204/159.23 |
| 4,442,022 | 4/1984 | van der Hauw et al. | 204/159.23 |

FOREIGN PATENT DOCUMENTS 2528358  1/1976  Fed. Rep. of Germany .
1408265 10/1975  United Kingdom .

OTHER PUBLICATIONS

J. Oil Col. Chem. Assoc., 1976, 59, pp. 157–165.
J. Chem. Soc. (C), 1969, pp. 2203–2207.

Primary Examiner—Allan M. Lieberman
Attorney, Agent, or Firm—Parkhurst & Oliff

[57] ABSTRACT

The present invention relates to a photopolymerizable composition comprising a polymerizable, polyethylenically unsaturated compound, benzil and/or fluorenone, a specific biphenyl ketone such as para-phenyl benzophenone, and a reducing agent such as a tertiary amine. The present composition permits rapid and complete curing. Moreover, in the photopolymerization of compounds sensitive to air inhibition non-tacky surfaces are obtained. The effect observed is based on a synergism between the present photoinitiators. The advantages of the invention are most manifest in curing relatively thick layers of materials.

11 Claims, No Drawings

PHOTOPOLYMERIZABLE COMPOSITION, PHOTOINITIATOR MIXTURE AND CURING PROCESS

This is a division of application Ser. No. 315,799, filed Oct. 28, 1981, now U.S. Pat. No. 4,442,022.

BACKGROUND OF THE INVENTION

Prior art photoinitiator systems comprising an aromatic carbonyl compound and a reducing agent are known from U.S. Pat. No. 3,759,807. In it are enumerated a great many aromatic carbonyl compounds, including acetophenone, 4-tolyl acetophenone, benzophenone, 3-tolyl benzophenone, fluorenone, anthraquinone, xanthone and thioxanthone. Reducing agents mentioned includes amines, viz. tertiary amines such as triethanolamine and methyldiethanolamine. Photopolymerizable compositions are also known from British Patent Specification No. 1,408,265, which also mentions a great many aromatic carbonyl compounds, including benzil, benzil derivatives, naphthyl, phenanthraquinone, benzophenone, benzoin, benzoin ethers and fluorenone.

Although these prior art photoinitiator systems may be satisfactorily applied for various purposes, a particular problem exists in completely and rapidly curing material having a thickness of 1–20 mm. Moreover, in the case of polymerizable, polyethylenically unsaturated compounds such as methacrylate resins that are sensitive to air inhibition, there is the problem of insufficient surface hardening, which manifests itself in a tacky surface. For optimum properties, there are two requirements: the material should be both thoroughly cured and of a good surface hardness.

Often the known photoinitiator systems satisfy only one of the two requirements. In actual practice, it has therefore often been found necessary to isolate the surface to be cured from the ambient air by covering it with a transparent film to obtain a satisfactory surface hardness and/or to use prolonged exposure times for thorough curing.

SUMMARY OF THE INVENTION

The photopolymerizable composition according to the invention is non-tacky, rapid setting, and hard curing, and comprises:

a. a polymerizable, polyethylenically unsaturated compound;
b. benzil and/or fluorenone;
c. A biphenylyl ketone of the formula:

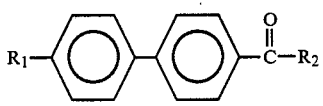

wherein:

$R_1$ = hydrogen, an alkyl group having 1–8 carbon atoms, an alkoxy group having 1–10 carbon atoms, an alkyl carbonyl group having 2–12 carbon atoms or a halogen atom; and $R_2$ = an alkyl group having 1–12 carbon atoms, phenyl, naphthyl, furyl or thiophenyl, which groups may be substituted or not; and d. a reducing agent capable of reducing the aromatic carbonyl compounds when they are in the excited state.

It has been found that the use of the above-mentioned composition permits rapid and complete curing of relatively thick layers of the polymerizable polyethylenically unsaturated compound. In the photopolymerization of compounds sensitive to air inhibition it is possible, moreover, to obtain non-tacky surfaces. The use of only benzil and/or fluorenone generally leads to better curing but to a lower surface hardness than the sole use of a corresponding amount of the present biphenylyl ketones.

As far as these aspects are concerned, it was found that a corresponding amount of a mixture of these aromatic carbonyl compunds results in both rapid curing and high surface hardness of the polymerizable compound. Moreover, it has been surprisingly found that the result is not merely cumulative but is synergistic, and that this synergistic effect is not produced by other combinations of the above-mentioned initiators.

The present composition contains a polymerizable, polyethylenically unsaturated compound. Examples thereof include polymethacrylates and polyacrylates, the acryl being built in as reactive end group in a polymer chain, via hydroxy, amino, carboxy, isocyano or epoxy groups. Examples of this last mentioned type of compound include polyacryl-modified polyesters, polyamides, polyethers, polyurethanes and polyvinyl resins. Optionally, the polyethylenically unsaturated compound may be mixed with a co-polymerizable unsaturated monomer such as acrylic esters and methacrylic esters, acrylic and methacrylic amides and acrylic and methacrylic nitriles, for instance acrylonitrile, methyl methacrylate and 2-ethylhexyl acrylate. To that end, use may further be made of vinyl esters and vinylidene esters, vinyl ethers and vinyl ketones, such as vinyl acetate, vinyl propionate, N-vinyl-pyrrolidone and vinylbutyl ether.

Moreover, monomers may be added that have more than one unsaturated terminal group. Examples thereof include diallyl phthalate, diallyl fumarate, ethylene glycol dimethacrylate, pentaerythritol triacrylate, trimethylol propane triacrylate, neopentyl glycol dimethacrylate and polyethylene glycol diacrylate. The monomers that may be used include suitable copolymerizable hydrocarbons, such as styrene, vinyl toluene and divinyl benzene.

The present composition also may contain a mixture of an unsaturated polyester resin and a monomeric compolymerizable compound, such as styrene. The unsaturated polyester resins may be prepared in a known manner from unsaturated polycarboxylic acids or their anhydrides, such as maleic anhydride or fumaric acid, and generally in the presence of aromatic and/or saturated aliphatic dicarboxylic acids such as phthalic anhydride, tetrahydrophthalic anhydride, adipic acid and the like and polyols, such as ethylene glycol, diethylene glycol, propylene glycol and the like, and after the polyester preparation the terminal carboxylic groups may be further reacted to completion with reactive epoxides, such as phenylglycidyl ether.

The present photoinitiator mixture contains a mixture of aromatic carbonyl compounds which at least consists of:

a. benzil and/or fluorenone; and
b. a biphenyl ketone of the formula:

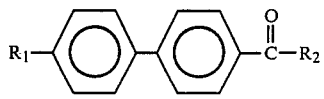

wherein:

$R_1$ = hydrogen, an alkyl group having 1–8 carbon atoms, an alkoxy group having 1–10 carbon atoms, an alkyl carbonyl group having 2–12 carbon atoms or a halogen atom; and $R_2$ = an alkyl group having 1–12 carbon atoms, phenyl, naphthyl, furyl or thiophenyl, which groups may be substituted or not.

The group $R_2$ may be substituted, for instance with the groups denoted by $R_1$.

Examples of suitable biphenylyl ketones include: para-phenyl acetophenone, para-phenyl benzophenone, para-tolyl benzophenone, para, para'-diacetyl biphenyl, para-(para-chlorophenyl)-benzophenone, para-(para-methoxyphenyl)-benzophenone, α-furyl biphenylyl ketone, α-naphthyl biphenylyl ketone, para-tertiary butyl phenyl biphenylyl ketone, para-methoxy phenyl biphenylyl ketone and 2,4-dichlorophenyl biphenylyl ketone.

As biphenylyl ketone the composition preferably contains para-phenyl benzophenone. As regards benzil and fluorenone it should be noted that both have a triplet energy of 53–54 kcal/mole, whereas p-phenyl benzophenone has a triplet energy of about 60 kcal/mole.

The present composition generally contains 0.1–1.5% by weight and preferably 0.5–1.0% by weight of the aromatic ketone mixture. The molar ratio of the biphenylyl ketone to the benzil and/or fluorenone is generally in the range of from 0.25 to 9 and preferably in the range of from 0.5 to 3.0.

The present photopholymerizable compositions should also contain a reducing agent. It should be capable of reducing the aromatic ketones when they are in the excited state and moreover, after oxidation thereof, of initiating the polymerization of the polyethylenically unsaturated compound via intermediately formed radicals.

Suitable reducing agents are described in, int.al., British Patent specification No. 1,408,265. The compounds described have the formula

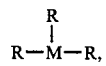

where M is an element of group Vb of the Periodic Table of the Elements and the groups R, which may be the same or different, are hydrogen atoms, hydrocarbon groups, substituted hydrocarbon groups or groups in which two groups R together with the element M form a cyclic ring system, no more than two of the groups R being hydrogen atoms. Where the element M is attached directly to an aromatic group R, at least one of the other groups has an

group attached to M.

It is preferred that as reducing agent there should be used an amine, more particularly a tertiary amine. Examples of suitable amines include triethanolamine, triisopropanolamine, N-methyl diethanolamine, N,N-dimethyl ethanolamine, N,N-dimethyl isopropanolamine, N-hydroxyethyl piperidine, N-hydroxyethyl morpholine, bis(2-hydroxymethyl)oleylamine, N,N,N',N'-tetramethyl-1,3-diaminopropane, N,N-dimethyl benzylamine, N,N-dimethyl aniline, 4-dimethyl aminobenzoate, dimethyl aminoethyl acrylate and dimethyl aminoethyl methacrylate.

The present composition generally contains 0.1–4.5% by weight, preferably 0.25–2.0% by weight of reducing agent. The weight ratio between the mixture of aromatic ketones and the reducing agent is generally in the range of 1:3 to 3:1, preferably 2:1 to 1:2.

The present compositions are cured by exposure to radiation in a known manner. To that end use is generally made of a radiation source emitting radiation having a wave length in the range of 200 to 500 nm. Suitable radiation sources include medium-pressure mercury lamps.

The invention also relates to the curing of relatively thick layers of material (i.e., having a thickness of 1–20 mm, more particularly 4–10 mm) based on the present photopolymerizable compositions. When the photopolymerizable compositions according to the invention are treated in this way their advantages will be the most manifest. Cured reinforced laminates based on the present composition and having a thickness of 4–10 mm possess excellent properties.

As reinforcing material there may be used glass fibers in the form of bundles (rovings), glass mats, glass fibers, or glass webs, optionally in combination with layers of other (textile) materials.

DESCRIPTION OF PREFERRED EMBODIMENTS

The invention is further described in the following examples. Measures of the surface hardness and the degree of curing of the laminates were the non-tackiness of the boundary surfaces and the Barcol indentation hardness (type 934-1).

The maximum possible indentation hardness depends on type of resin, degree of curing, type of reinforcement and degree of reinforcement. All amounts are expressed in percentage by weight.

EXAMPLES 1 THROUGH 6

A resin solution was prepared consisting of 97% of technical 4,4'-isopropylidene bis(phenylene oxyethyl methacrylate), 2% of triisopropanolamine and 1% of aromatic ketone(s). The solution obtained was used for preparing glass-reinforced laminates. They were built up of the resin and four layers of glass fiber mat. The thickness of the laminates was about 4 mm and the glass content 54%. The material was cured with a Philips medium-pressure mercury lamp of the HIQ-4 type having an intensity of radiation of 20 W per cm. The distance between the lamp and the laminate was 20 cm and the curing time four minutes.

The Examples 1 through 4 in Table 1 show the results obtained with benzil, para-phenyl benzophenone and mixtures of these carbonyl compounds. The Examples 5 and 6 are for comparison, use being made of a resin solution composed of 98.5% of said bis-methacrylate, 1% triisopropanolamine and 0.5% of aromatic ketone.

TABLE 1

| Example | Percent Aromatic ketone(s) | state of laminate surface | | | |
|---|---|---|---|---|---|
| | | tackiness | | indentation hardness | |
| | | upper | under | upper | under |
| 1 | 1.00% p-phenyl benzophenone | tack-free | tack-free | 47.5 | 37.3* |
| 2 | 0.66% p-phenyl benzophenone 0.33% benzil | tack-free | tack-free | 51.1 | 52.4 |
| 3 | 0.50% p-phenyl benzophenone 0.50% benzil | tack-free | tack-free | 48.4 | 47.6 |
| 4 | 1.00% benzil | tacky | tack-free | 46.7 | 48.9 |
| 5 | 0.50% benzil | tacky | tacky-free | 30.9 | 39.9* |
| 6 | 0.50% p-phenyl benzophenone | tacky | wet | 33.8 | not measurable |

*insufficiently cured

The examples 2 and 3 show the synergistic effect which results from the use of the present photoinitiator system.

EXAMPLES 7-12

For comparison the experiments of the Example 1 through 4 were repeated except that use was made of different aromatic carbonyl compounds.
The results are summarized in Table 2.

TABLE 2

| Example | Aromatic carbonyl compound (%) | state of laminate surface | | | |
|---|---|---|---|---|---|
| | | tackiness | | indentation hardness | |
| | | upper | under | upper | under |
| 7 | 1.00% benzophenone | tacky | wet | 41.3 | not measurable* |
| 8 | 1.00% benzoin | tacky | wet | 45.7 | not measurable* |
| 9 | 1.00% benzil dimethyl ketal | tacky | tack-free | 47.8 | 34.6* |
| 10 | 0.33% benzophenone 0.66% p-phenyl benzophenone | tacky | tacky | 41.2 | 23.0* |
| 11 | 0.33% benzoin 0.66% p-phenyl benzophenone | tacky | tack-free | 50.2 | 40.3* |
| 12 | 0.33% benzil dimethyl ketal 0.66% p-phenyl benzophenone | tacky | wet | 40.3 | not measurable* |

*insufficiently cured

The results in Table 2 demonstrate that the combination of para-phenyl benzophenone and other known photoinitiators such as benzophenone, benzoin, and benzil dimethyl ketal does not produce any synergistic effect at all.

EXAMPLES 13 THROUGH 22

Laminates were prepared that were made up of the resin described in the Examples 1 through 6 and four layers of glass mat. The laminate thickness was 4 mm, the glass content 26%. Curing was effected in the manner indicated in the Examples 1 through 6 in the presence of 2% of triisopropanolamine, as was the testing of the laminate properties. Table 3 shows the results.

TABLE 3

| Example | Aromatic carbonyl compound (%) | state of laminate surface | | | |
|---|---|---|---|---|---|
| | | tackiness | | indentation hardness | |
| | | upper | under | upper | under |
| 13 | 0.50% benzil 0.50% p-phenyl benzophenone | tack-free | tack-free | 35.1 | 36.4 |
| 14 | 0.50% fluorenone 0.50% p-phenyl benzophenone | tack-free | tack-free | 40.5 | 39.0 |
| 15 | 0.50% benzil 0.50% fluorenone | tacky | tack-free | 34.1 | 37.1 |
| 16 | 0.50% benzil 0.50% benzophenone | tacky | tack-free | 35.6 | 39.8 |
| 17 | 0.50% benzil 0.50% benzil dimethyl ketal | tacky | tack-free | 33.3 | 37.3 |
| 18 | 0.50% benzil 0.50% benzoin butyl ether | tacky | tack-free | 42.0 | 39.5 |
| 19 | 0.50% benzil 0.50% acetophenone | tacky | tack-free | 35.5 | 38.4 |
| 20 | 0.50% benzil 0.50% 1-phenyl propane 1,2-dione-2-oxime-o-benzoate | tacky | tack-free | 40.1 | 42.2 |
| 21 | 0.50% benzil 0.50% 2-hydroxy-2-benzoyl propane | tacky | tack-free | 36.8 | 41.4 |
| 22 | 0.50% benzil 0.50% 2-hydroxy 2(p.isopropyl benzoyl) propane | tacky | tack-free | 39.9 | 42.5 |

Only the compositions of the Examples 13 and 14 are the ones according to the invention. The others serve for comparison. The data show that satisfactory results are only obtained with the photoinitiator system according to the invention. Combinations of benzil with aromatic carbonyl compounds other than the present biphenyl ketones lead to insufficient surface hardening.

EXAMPLES 23 THROUGH 30

The procedure used in the Examples 13 through 22 was repeated, with the exception that as aromatic carbonyl compound there was used a mixture of 0.5% of benzil and 0.5% of the biphenylyl ketones mentioned in Table 4 and the distance between the lamp and the laminate was 15 cm. The results are given in Table 4.

TABLE 4

| Example | biphenylyl ketone | state of laminate surface | | | |
|---|---|---|---|---|---|
| | | tackiness | | indentation hardness | |
| | | upper | under | upper | under |
| 23 | p-phenyl acetophenone | tack-free | tack-free | 38.3 | 35.6 |
| 24 | p,p'diacetyl biphenyl | tack-free | tack-free | 38.0 | 38.8 |
| 25 | α-furyl biphenylyl ketone | tack-free | tack-free | 35.6 | 37.4 |
| 26 | α-thiophenyl biphenylyl ketone | tack-free | tack-free | 40.3 | 35.1 |
| 27 | α-naphthyl biphenylyl ketone | tack-free | tack-free | 43.0 | 42.8 |
| 28 | p-tolyl benzophenone | tack-free | tack-free | 38.3 | 35.6 |
| 29 | p-methoxphenyl benzophenone | tack-free | tack-free | 34.3 | 40.7 |
| 30 | p-chlorophenyl benzophenone | tack-free | tack-free | 37.3 | 36.1 |

The above results show that the above-described synergism also occurs in the case of biphenylyl ketones other than paraphenyl benzophenone.

EXAMPLES 31 THROUGH 39

Glass-reinforced laminates were constructed from twelve layers of glass fiber mat and from the resin described in Examples 1 through 6. The laminate that was formed had a thickness of about 10 mm and a glass content of 55%.

In the resin there was dissolved a mixture of aromatic ketones made up of 45% of benzil and 55% of p-phenyl benzophenone. As a reducing agent there was added triisopropanolamine in an amount such that the weight ratio of the amine to the ketone mixture was 2.

The laminates were exposed to radiation from a Philips medium-pressure mercury lamp of the HIQ-4 type. The distance between the lamp and the laminate was 20 cm, and the radiation times were 8, 10 and 12 minutes, respectively. The results are shown in Table 5.

TABLE 5

| Example | Amount of ketone mixture | radiation time (min.) | state of laminate surface tackiness upper | under | indentation hardness upper | under |
|---|---|---|---|---|---|---|
| 31 | 1.00% | 8 | tack-free | tack-free | 45.2 | 47.0 |
| 32 | 1.00% | 10 | tack-free | tack-free | 46.1 | 44.1 |
| 33 | 1.00% | 12 | tack-free | tack-free | 45.9 | 44.8 |
| 34 | 0.50% | 8 | tack-free | tack-free | 42.7 | 46.7 |
| 35 | 0.50% | 10 | tack-free | tack-free | 43.1 | 43.9 |
| 36 | 0.50% | 12 | tack-free | tack-free | 45.6 | 45.6 |
| 37 | 0.20% | 8 | tack-free | tacky | 38.4 | 0.0 |
| 38 | 0.20% | 10 | tack-free | tack-free | 37.6 | 47.1 |
| 39 | 0.20% | 12 | tack-free | tack-free | 43.1 | 49.7 |

The above data show that satisfactory results can be obtained within acceptable radiation times even with the use of (very) small amounts of the photoinitiator system.

EXAMPLES 40 THROUGH 43

Glass-fiber reinforced tubes having a diameter of 88 mm and a wall thickness of 4 mm were made by passing a bundle of glass fibers through an impregnating bath containing 4,4'-isopropylidene-bis(phenylene oxyethylmethacrylate) in which there had been dissolved 1% of aromatic ketone(s) and 2% of triisopropanolamine and winding said bundle onto a rotary steel cylinder.

Subsequently, the impregnated product was exposed to 15 minutes' radiation from a Philips HIQ-4 lamp positioned at 15 cm above the rotating tube. The tubes obtained had a glass content of 70%. The results are given in Table 6. The Examples 40 through 42 serve for comparison.

TABLE 6

| Example | Aromatic ketone(s) (%) | state of boundary surfaces tackiness upper | under | indentation hardness upper | under |
|---|---|---|---|---|---|
| 40 | 1.0% benzil dimethyl ketal | tacky | tack-free loose fibers | 45.9 | 50.3 |
| 41 | 1.0% benzil | tacky | tack-free | 49.5 | 53.6 |
| 42 | 1.00% p-phenyl benzophenone | tack-free | tacky loose fibers | 40.2 | 49.0 |
| 43 | 0.50% benzil 0.50% p-phenyl benzophenone | tack-free | tack-free | 44.8 | 53.0 |

EXAMPLES 44 THROUGH 56

An unsaturated polyester resin was obtained by polycondensation of a molar mixture of phthalic anhydride and maleic anhydride with the equivalent amount of propylene glycol up to an acid number of 45 and dissolution in styrene to a content of 34% styrene. In the resin there were dissolved 1% of aromatic carbonyl compound(s) and 2% of triisopropanolamine. Subsequently, laminates were formed that were made up of this resin and four layers of reinforcing glass mat. The laminate thickness was about 4 mm and the glass content 26%. Radiation was done with a Philips HIQ-4 lamp. The distance between the laminate and the lamp was 20 cm. The results are summarized in Table 7. The Examples 44 through 53 serve for comparison. The Examples 54 through 56 serve to illustrate the invention.

These data, too, demonstrate the synergistic effect of the present initiator system. They further show the favorable results that may be obtained by the present invention.

TABLE 7

| Example | aromatic carbonyl compound(s) (%) | exposure (min.) | state of laminate surface tackiness upper | under | indentation hardness upper | under |
|---|---|---|---|---|---|---|
| 44 | 1% benzil dimethyl ketal | 5 | tack-free | tacky | 47.3 | 0.0 |
| 45 | 3% benzil dimethyl ketal | 5 | tack-free | tacky | 46.8 | 0.0 |
| 46 | 1% benzoin butyl ether | 5 | tack-free | wet | 50.7 | 0.0 |
| 47 | 3% benzoin butyl ether | 5 | tack-free | wet | 45.2 | 0.0 |
| 48 | 1% benzil | 3 | tack-free | tacky | 52.5 | 0.0 |
| 49 | 1% benzil | 4 | tack-free | tack-free | 49.5 | 7.5 |
| 50 | 1% benzil | 5 | tack-free | tack-free | 51.2 | 21.7 |
| 51 | 1% p-phenyl benzophenone | 3 | tack-free | wet | 0.0 | 0.0 |
| 52 | 1% p-phenyl benzophenone | 4 | tack-free | wet | 0.0 | 0.0 |
| 53 | 1% p-phenyl benzophenone | 5 | tack-free | wet | 0.0 | 0.0 |
| 54 | 0.5% benzil 0.5% p-phenyl benzophenone | 3 | tack-free | tacky | 46.4 | 0.0 |
| 55 | 0.5% benzil 0.5% p-phenyl benzophenone | 4 | tack-free | tack-free | 51.4 | 35.9 |
| 56 | 0.5% benzil 0.5% p-phenyl benzophenone | 5 | tack-free | tack-free | 48.2 | 53.1 |

What we claim is:

1. A process for the curing of laminates, comprising exposing to radiation a photopolymerizable composition comprising:
   a. a polymerizable, polyethylenically unsaturated compound;
   b. benzil, fluorenone or a mixture thereof;
   c. a biphenylyl ketone of the formula:

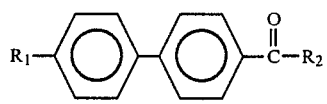

wherein:

$R_1$ = hydrogen, an alkyl group having 1-8 carbon atoms, an alkoxy group having 1-10 carbon atoms, an alkyl carbonyl group having 2-12 carbon atoms or a halogen atom; and $R_2$ = an alkyl group having 1-12 carbon atoms, phenyl, naphthyl, furyl or thiophenyl, which groups may be substituted or not;

d. a reducing agent capable of reducing the aromatic carbonyl compounds when they are in the excited state, wherein the molar ratio of said biphenylyl ketone to said benzil, fluorenone or mixture thereof is from 0.25 to 9 and wherein said benzil, fluorenone or mixture thereof and said biphenylyl ketone combined comprise an aromatic ketone mixture, said aromatic ketone mixture comprising between 0.1 and 1.5% of the weight of said composition, and said reducing agent comprising between 0.1 and 4.5% of the weight of said composition, and wherein the weight ratio of said aromatic ketone mixture to said reducing agent is from 1:3 to 3:1.

2. The process as set forth in claim 1, wherein said biphenylyl ketone contained in the composition is paraphenyl benzophenone.

3. A process as set forth in claim 1, wherein said reducing agent contained in the composition is a tertiary amine.

4. A process as set forth in claims 1, 2 or 3, wherein said laminates have a thickness of 1 to 20 mm.

5. A process for curing laminates, comprising mixing a photoinitiator mixture comprising a. benzil, fluorenone or a mixture thereof;

b. a biphenylyl ketone of the formula:

wherein:

$R_1$ = hydrogen, an alkyl group having 1-8 carbon atoms, an alkoxy group having 1-10 carbon atoms, an alkyl carbonyl group having 2-12 carbon atoms or a halogen atom and $R_2$ = an alkyl group having 1-12 carbon atoms, phenyl, naphthyl, furyl or thiophenyl, which groups may be substituted or not; and c. a reducing agent capable of reducing the aromatic carbonyl compounds when they are in the excited state; with a polymerizable, polyethylenically unsaturated compound and exposing the resultant mixture to radiation;

wherein the molar ratio of said biphenylyl ketone to said benzil, fluorenone or mixture thereof is from 0.25 to 9 and wherein said benzil, fluorenone or mixture thereof and said biphenylyl ketone combined comprise an aromatic ketone mixture, said aromatic ketone mixture comprising between 0.1 and 1.5% of the weight of said resultant mixture, and said reducing agent comprises between 0.1 and 4.5% of the weight of said resultant mixture, and wherein the weight ratio of said aromatic ketone mixture to said reducing agent is from 1:3 to 3:1.

6. The process as set forth in claim 1, wherein said biphenylyl ketone is para-phenyl benzophenone.

7. The process as set forth in claim 1, wherein said reducing agent is a tertiary amine.

8. The process as set forth in claim 6, wherein said reducing agent is a tertiary amine.

9. The process as set forth in claims 5, 6, 7, or 8, wherein said laminates have a thickness of 1 to 20 mm.

10. The process as set forth in claim 1, wherein said laminates are reinforced laminates, and comprise at least one reinforcing material selected from the group consisting of glass fibers and textile materials.

11. The process as set forth in claim 10, wherein said glass fibers are in a form selected from the group consisting of rovings, mats and webs.

* * * * *